(12) United States Patent
Ting (10) Patent No.: US 7,081,021 B1
(45) Date of Patent: Jul. 25, 2006

(54) CARD CONNECTOR

(75) Inventor: Chien Jen Ting, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/169,396

(22) Filed: Jun. 28, 2005

(30) Foreign Application Priority Data

Jan. 28, 2005 (TW) .............................. 94201595 U (51) Int. Cl.
*H01R 24/00* (2006.01)
(52) U.S. Cl. ..................................................... 439/630
(58) Field of Classification Search ................ 439/630, 439/310, 541.5, 64
See application file for complete search history.

(56) References Cited

U.S. PATENT DOCUMENTS

| 6,551,132 B1 | 4/2003 | Kuo | |
| 6,623,305 B1* | 9/2003 | Chun-Lung | 439/630 |
| 2002/0160661 A1* | 10/2002 | Florescu | 439/630 |
| 2004/0033722 A1* | 2/2004 | Liu et al. | 439/630 |
| 2004/0058585 A1* | 3/2004 | Nagata | 439/630 |
| 2005/0287870 A1* | 12/2005 | Kuo | 439/630 |

* cited by examiner

*Primary Examiner*—Phuong Dinh
(74) *Attorney, Agent, or Firm*—Wei Te Chung (57) ABSTRACT

A card connector comprises a header comprising an insulating main body; a shield member coupled on the header to define a card receiving space; a plurality of first contacts and second contacts disposed in the insulating main body; a stopper approximately arranged in a row with the first contacts along a transverse direction and protruding into the card receiving space approximately from a corner of the main body, and spaced with the shield coupled on an upper face of the main body to define a daughter space therebetween with the second contacts exposed in to receive the second card.

10 Claims, 9 Drawing Sheets

CARD CONNECTOR

BACKGROUND OF THE INVENTION

1. Field of the Invention

The present invention relates to a card connector, more particularly to an improved card connector for connecting two different electrical cards to a printed circuit board (PCB).

2. Description of Related Art

With the tendency of reducing the size of a computer device, demand has arisen for increasing its data storage capacity at low cost. Generally, electrical cards, such as express cards or smart cards, are data storage devices which are electrically connected to the computer device. The electrical cards are portable instruments that are easily inserted into and extracted from card connectors of the computer device.

Due to the ever-increasing demand in today's Notebook Personal Computer (Notebook-PC) for high-capacity signal transmission, more card connectors are arranged in "dual port" or stacked configurations. Example of this card connector is disclosed in U.S. Pat. No. 6,551,132. Such card connector commonly includes an upper connector and a lower connector stacked together for receiving individual electrical cards therein and respectively electrically connecting the electrical cards to a PCB. This card connector meets the requirement of high-capacity data transmission since it can simultaneously receive two different types of electrical cards therein. However, the overall size of the card connector is not reduced at all since the card connector simply stacks the upper connector and the lower connector together. It is not suitable to install such card connector in the Notebook-PC for it occupies too much space. Thus a card connector is required which defines a card receiving space for receiving two different cards and can prevent misinsertion of cards at the same time.

Therefore, the present invention is directed to solving the above problems by providing an improved card connector.

SUMMARY OF THE INVENTION

An object of the present invention is to provide a card connector which defines a card receiving space for receiving two different cards and can prevent misinsertion of cards.

Accordingly, to achieve above-mentioned object, a card connector comprises a header comprising an insulating main body; a shield member coupled on the header to define a card receiving space; a plurality of first contacts and second contacts disposed in the insulating main body and exposed in the card receiving space along a vertical direction to electrically connect with a first card and a second card respectively, the first card may approximately occupy the card receiving space fully; and a stopper approximately arranged in a row with the first contacts along a transverse direction and protruding into the card receiving space approximately from a corner of the main body, and spaced with the shield coupled on an upper face of the main body to define a daughter space therebetween with the second contacts exposed in to receive the second card.

The detailed features of the present invention will be apparent in the detailed description with appropriate reference to the accompanying drawings.

DETAILED DESCRIPTION OF THE INVENTION

As shown in FIGS. 1 to 9, the card connector in an embodiment of the present invention can be used commonly for a thin, wide card such as a smart card 9 and a thick, narrow card such as a rectangular express card 7 or a L-shaped express card 8. The present invention, however, is not limited to the use of these cards but also be applied satisfactorily to other cards.

Figure 1:
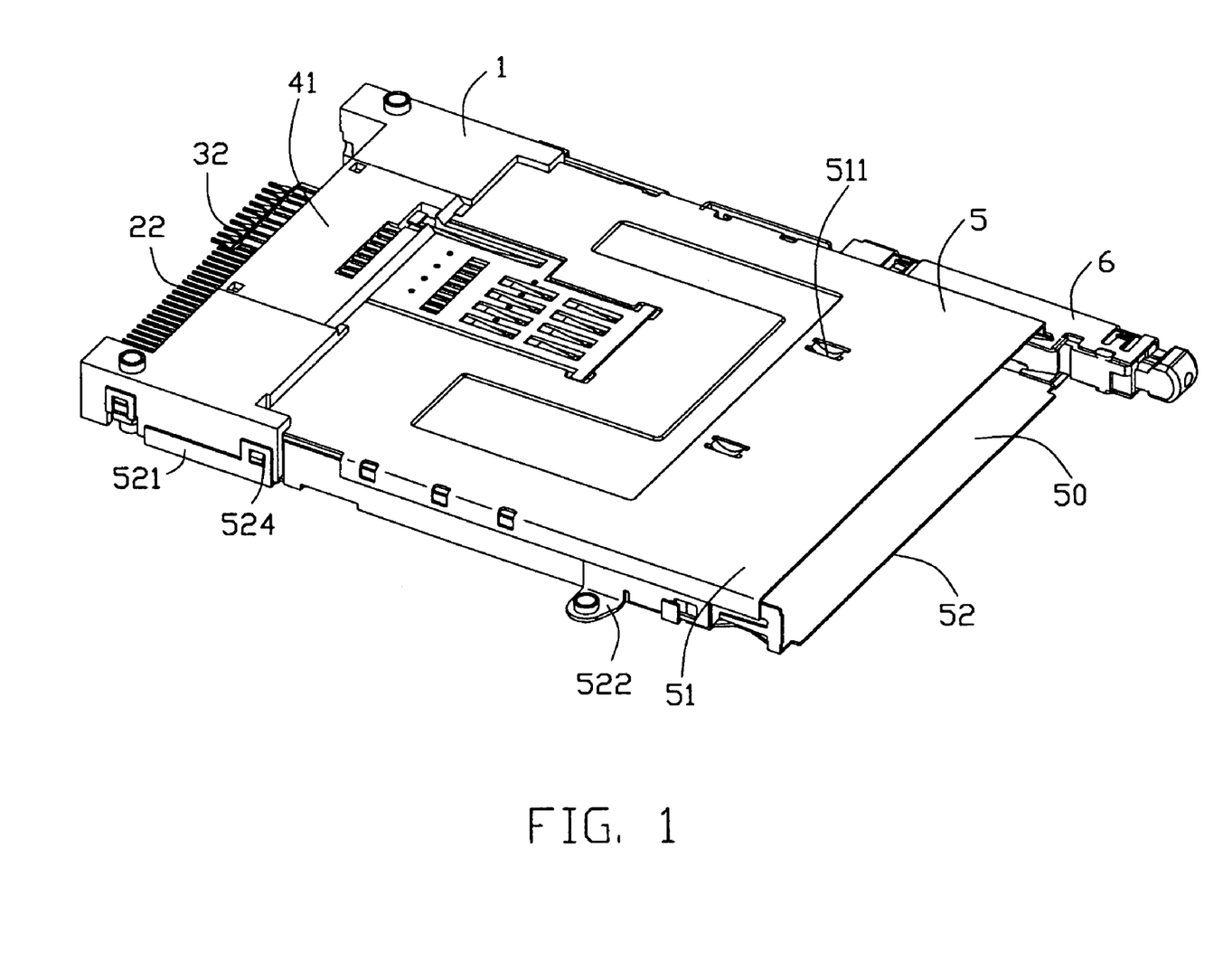
FIG. 1 is an assembled perspective view of the card connector in accordance with an embodiment of the present invention.
Figure 3:
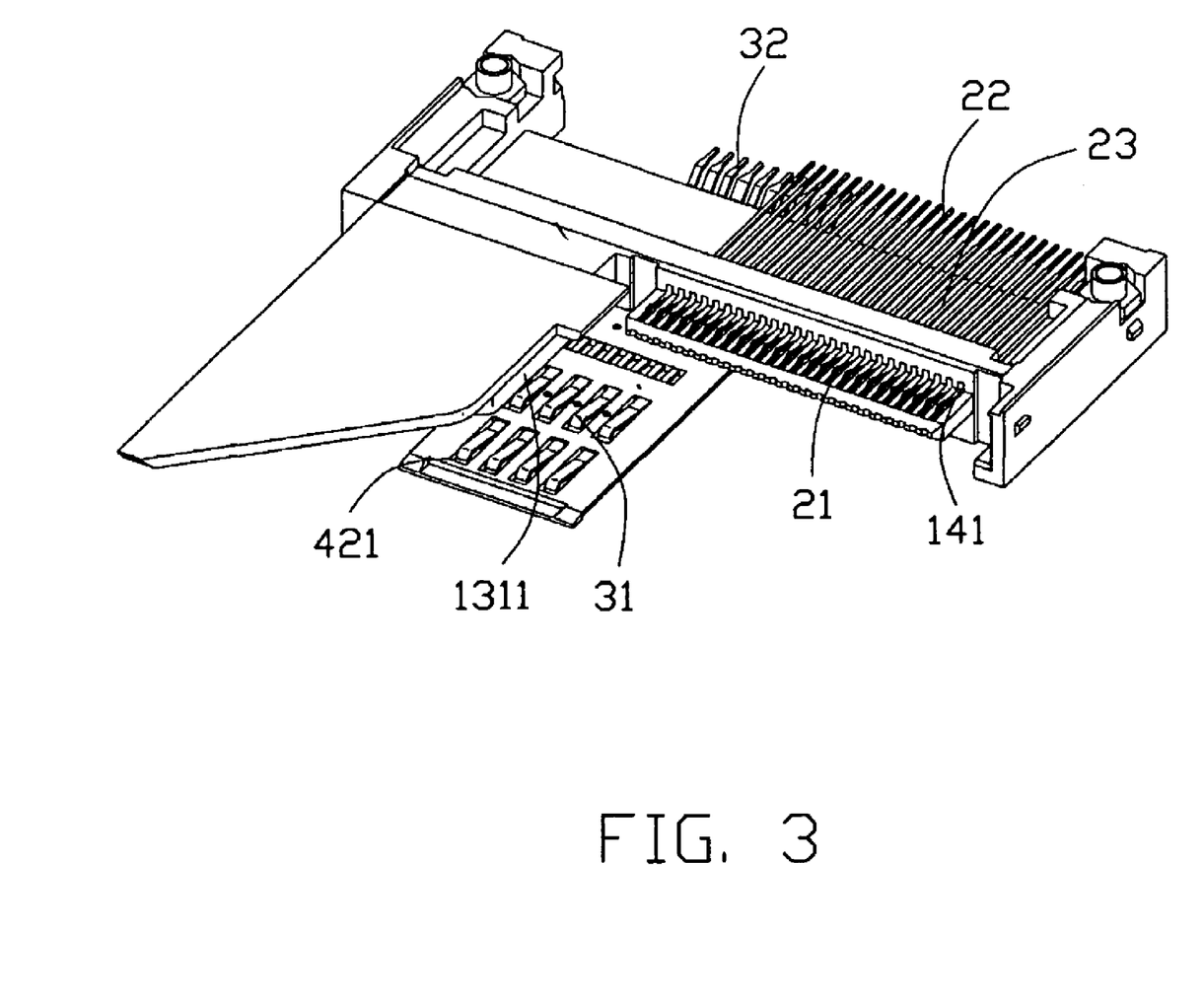
FIG. 3 is a same perspective view of the card connector shown in FIG. 2, but from another aspect.

Referring to FIGS. 1 and 3, the card connector of a preferred embodiment of the present invention comprises a header 1, a plurality of first electrical contacts 2 disposed in the header 1 for electrically connecting with the express card 7 or 8, a plurality of second electrical contacts 3 disposed in a contact module 4 which is assembled to the header 1 over the first contacts 2 for electrically connecting with the smart card 9, a shield member 5 and an ejector 6.

The shield member 5 is approximately rectangular frame and the shield member 5 is coupled on the header 1 to define a card receiving space 111 with an inserting opening 50. That is to say, the card receiving space 111 is defined among an upper shield member 51, a lower shield member 52 of the shield member 5 and the header 1. The upper shield member 51 which is formed by stamping a metal sheet is formed with a resilient portion 511 adjacent to the card inserting opening 50. A part of the lower shield member 52 is covered on a bottom face of the header 1. Opposite lateral sides of the part are bent upwardly to form a pair of flanges 521, a pair of holes 524 are disposed along the flanges 521 for engaging with ribs 113 of opposite sides of the header 1. The connector comprises a pair of stand off devices 522 disposed on lateral sides of the lower shield member 52 adjacent to the card inserting opening 50. The ejector 6 is disposed on one side of the shield member 5 for ejecting cards.

The header 1 comprises an elongated insulating main body. The main body has a middle bar 12, a pair of guiding arms 11 extending from opposite sides of the middle bar 12, a stopper 13 and a tongue portion 14 both extending towards the card inserting opening 50 from a lower part of the middle bar 12. The stopper 13 and the upper shield 51 are spaced each other to define a daughter space 112 therebetween in the card receiving space 112 along a vertical direction. The stopper 13 and the tongue portion 14 are arranged approximately in a row along a transverse direction in the card receiving space 111. The daughter space 112 is for receiving the smart card 9 served as a second card and the card receiving space 111 is approximately for fully receiving the rectangular express card 7 or L-shaped express card 8 server as a first card. However, because the daughter space 112 is in the card receiving space 111, the card connector can only receive one card one time.

Figure 2:
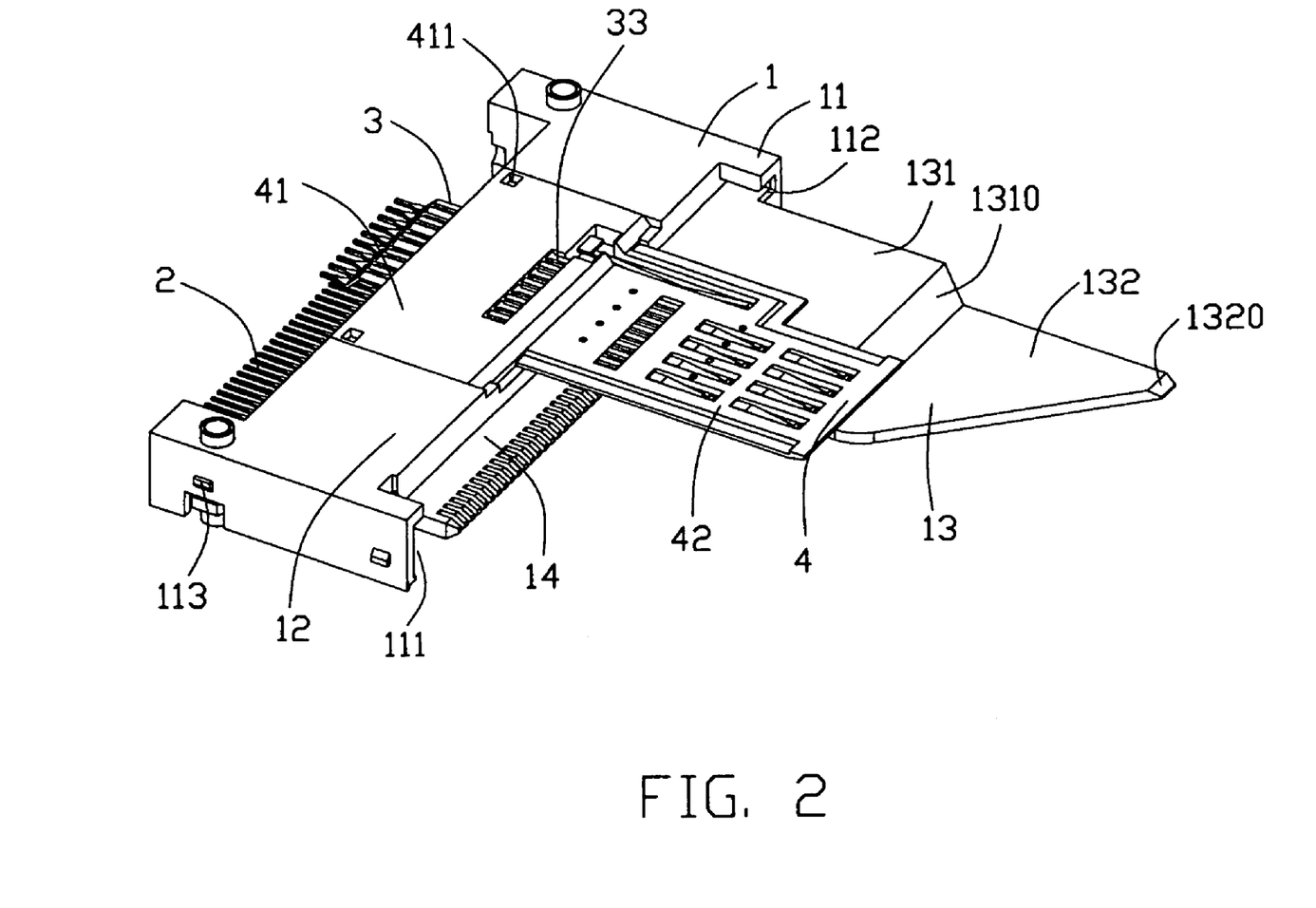
FIG. 2 is a partly assemble perspective view of the card connector shown in FIG. 1 with a shield and an ejector not assembled.

Referring to FIGS. 2 and 3, the first electrical contacts 2 are arrayed in the tongue portion 14. Each contact 2 comprises a contacting portion 21, a tail portion 22 and a connecting portion 23 connecting the contacting portion 21 and the tail portion 22. The contacting portion 21 is received in a receiving slot 141 of the holding portion 41 and exposed in the card receiving space 111 of the card receiving space for electrically connecting with the rectangular express card 7 or the L-shaped express card 8. The tail portion 22 is extending out of the middle bar 12 from the connecting portion 23 opposite to the contacting portion 21.

The contact module 4 is secured on a the main body of the header 1 with the second contacts 3 being arranged on and located over the tongue portion 14 with the first contacts 2 being received in. The contact module 4 comprises a base portion 41 and a receiving portion 42 extending towards the card inserting opening 50 from the base portion 41. The base portion 41 is located on the upper face of the middle bar 12 in virtue of a pair of holes 411 engaging with a pair of corresponding latches (not shown) of the middle bar 12. The receiving portion 42 is positioned in the opening (not shown) of the upper shield member 51 and faced into the daughter space 112 of the card receiving space 50. Each contact 3 comprises a contacting portion 31 received in a corresponding receiving slot 421 of the receiving portion 42 and exposed in the daughter space 112 for electrically connecting with the smart card 9, a locating portion 33 secured in the base portion 41 of the contact module 4 and a tail portion 32 extending out of the base portion 41 opposite to the contacting portion 31.

The stopper 13 is extending into the first card receiving cavity 111 from the middle bar 12 of the main body. The stopper 13 comprises a first guiding portion 131 adjacent to the header 1, a second guiding portion 132 away from the header 1 and a sloping portion 1310 connected the first guiding portion 131 and the second guiding portion 132. The first guiding portion 131 is approximately rectangular, the second guiding portion 132 is approximately echelon and end of the second guiding portion 132 adjacent to the card inserting opening 50 is formed with a sloping face 1320. The guiding portion 13 is further formed with a guiding face 1311 exposed in the card receiving space 111 on one side thereof to face to the holding portion 41. Distance between the first guiding portion 131 and the receiving portion 42 of the contact module 4 is smaller than that between the second guiding portion 132 and receiving portion 42, and the daughter space 112 is just defined between surfaces which the first guiding portion 131 and the receiving portion 42 are in, respectively.

Figure 4:
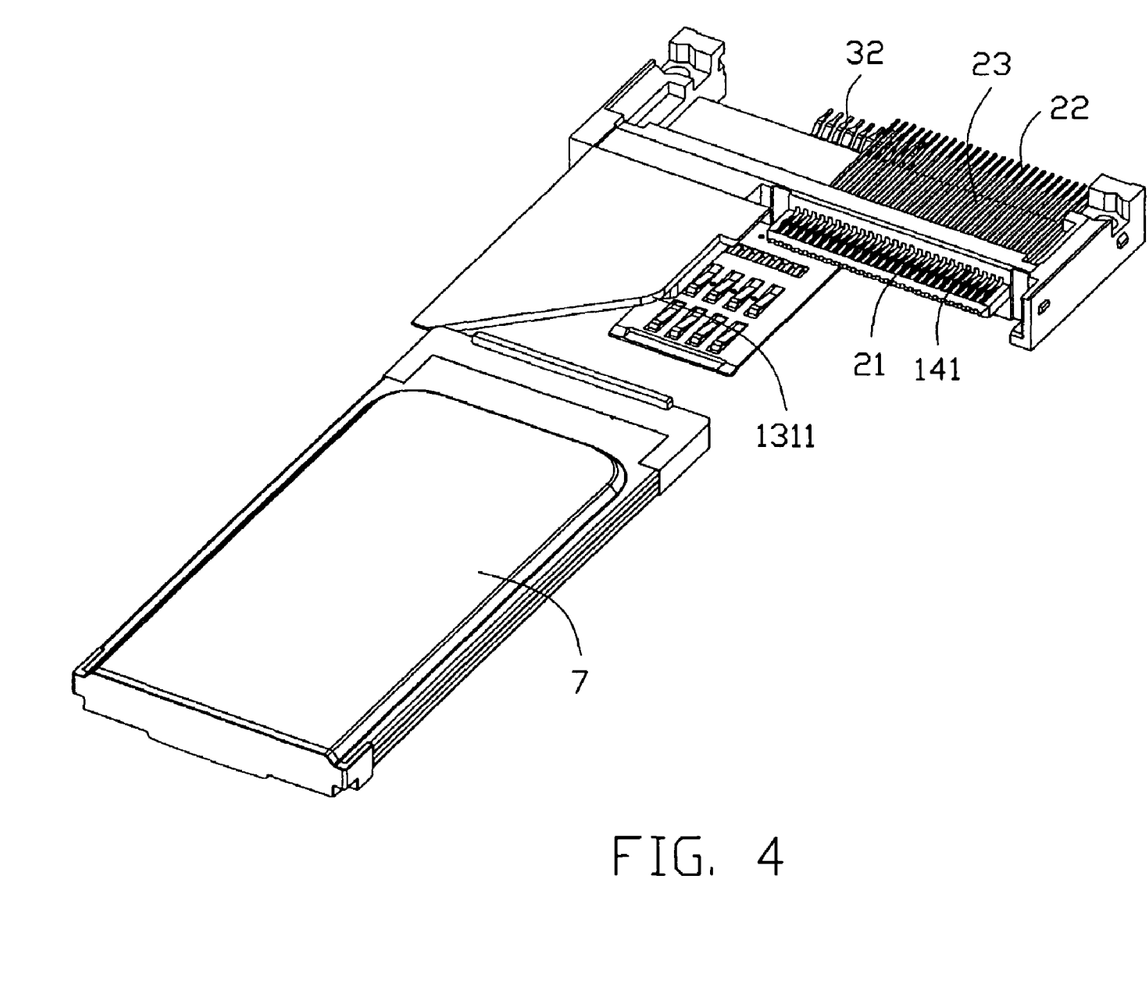
FIG. 4 is a partly assembled perspective view of the card connector shown in FIG. 1, showing original status of insertion of an express card 7.
Figure 5:
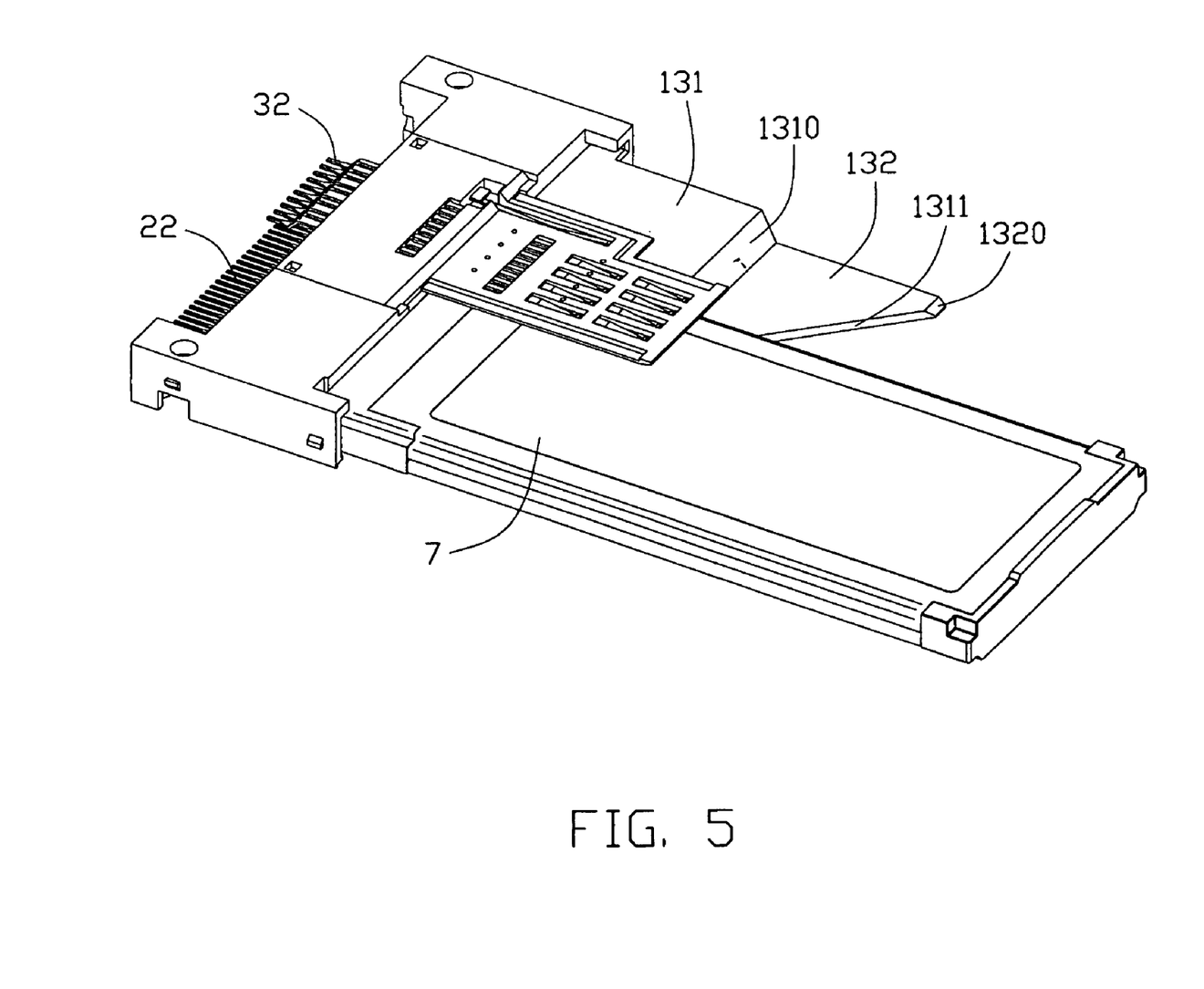
FIG. 5 is a partly assembled perspective view of the card connector shown in FIG. 1, showing final status of insertion of the express card 7.

Referring to FIGS. 2, 4 and 5, when the rectangular express card 7 is inserted into the card receiving space from the card inserting opening 50, it can not be inserted into the daughter space 112 because the distance between the first guiding portion 131 and the receiving portion 42 of the contact module 4 is smaller than height of the express card 7 and width of the express card 7 is small. Thus the express card 7 will only inserted into the card receiving space 111 along the guiding face 1311 of the stopper 13 to electrically connect with the contacting portions 21 of the first contacts 2.

Figure 6:
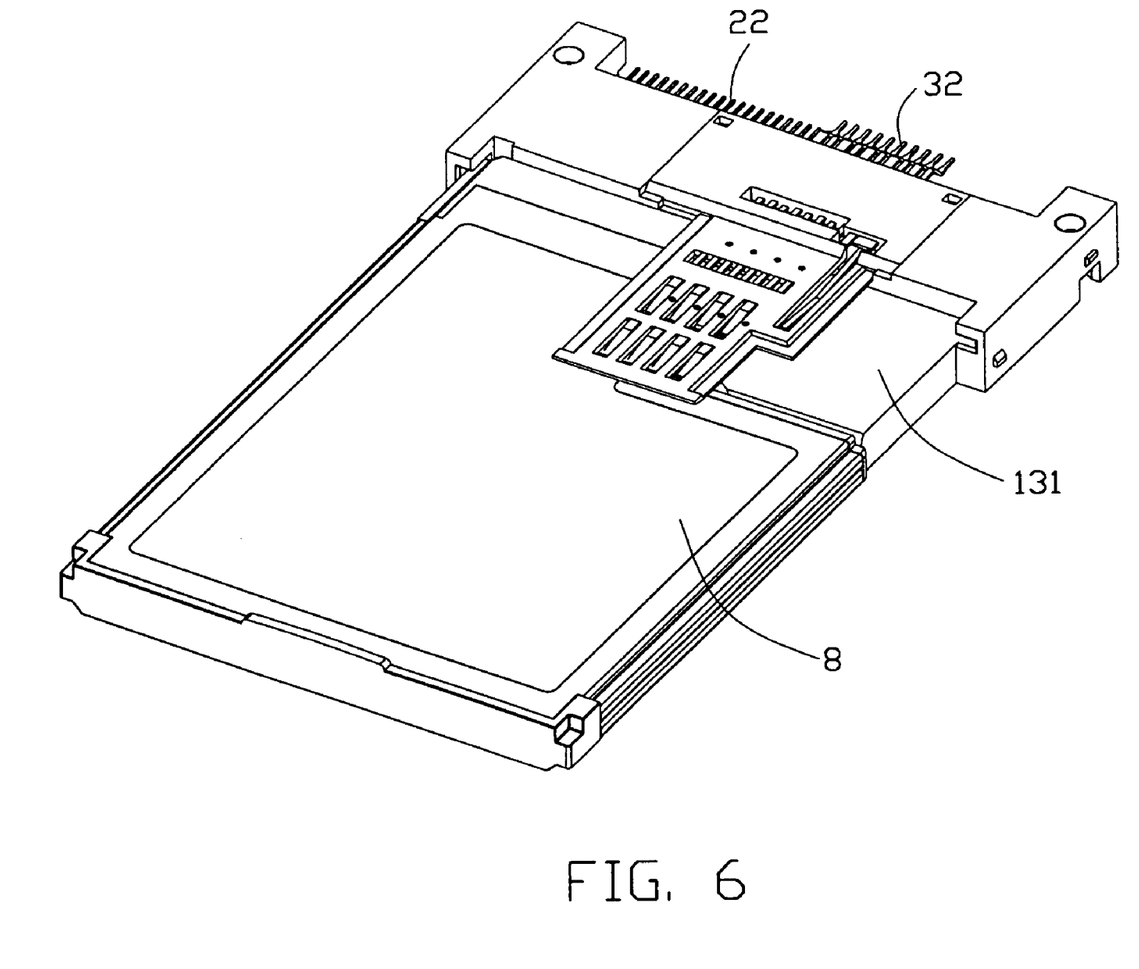
FIG. 6 is a partly assembled perspective view of the card connector shown in FIG. 1, showing final status of insertion of a express card 8.
Figure 7:
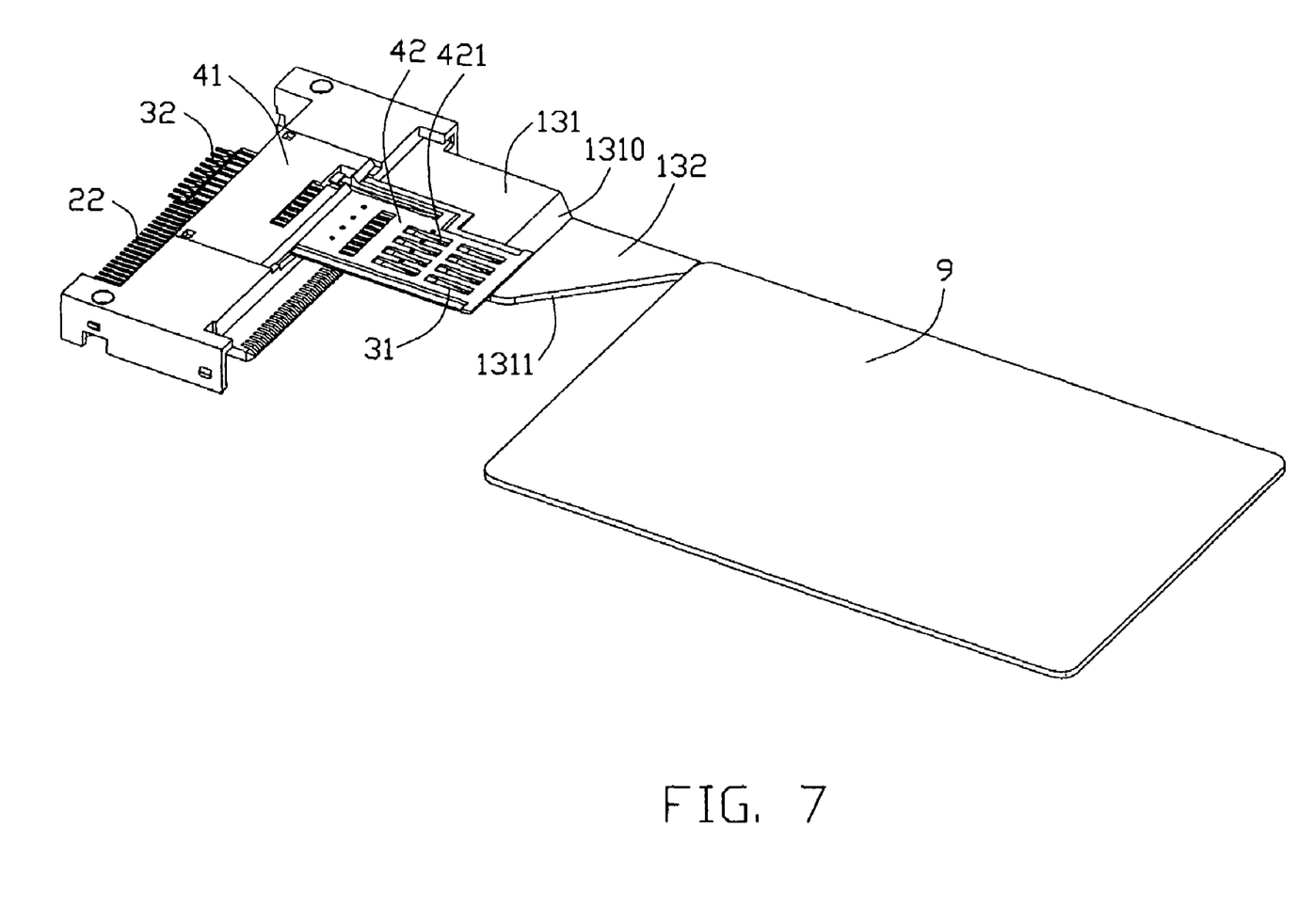
FIG. 7 is a partly assembled perspective view of the card connector shown in FIG. 1, showing original status of insertion of a smart card.

Referring to FIGS. 2 and 6, the L-shaped express card 8 has same height with the rectangular express card 7 and width of a head portion of the express card 8 is same with that of the rectangular express card 7, thus the express card 8 can only inserted into the card receiving space 111 and electrically connected with the contacting portions 21 of the first contacts 2 arrayed in the tongue portion 14.

Figure 8:
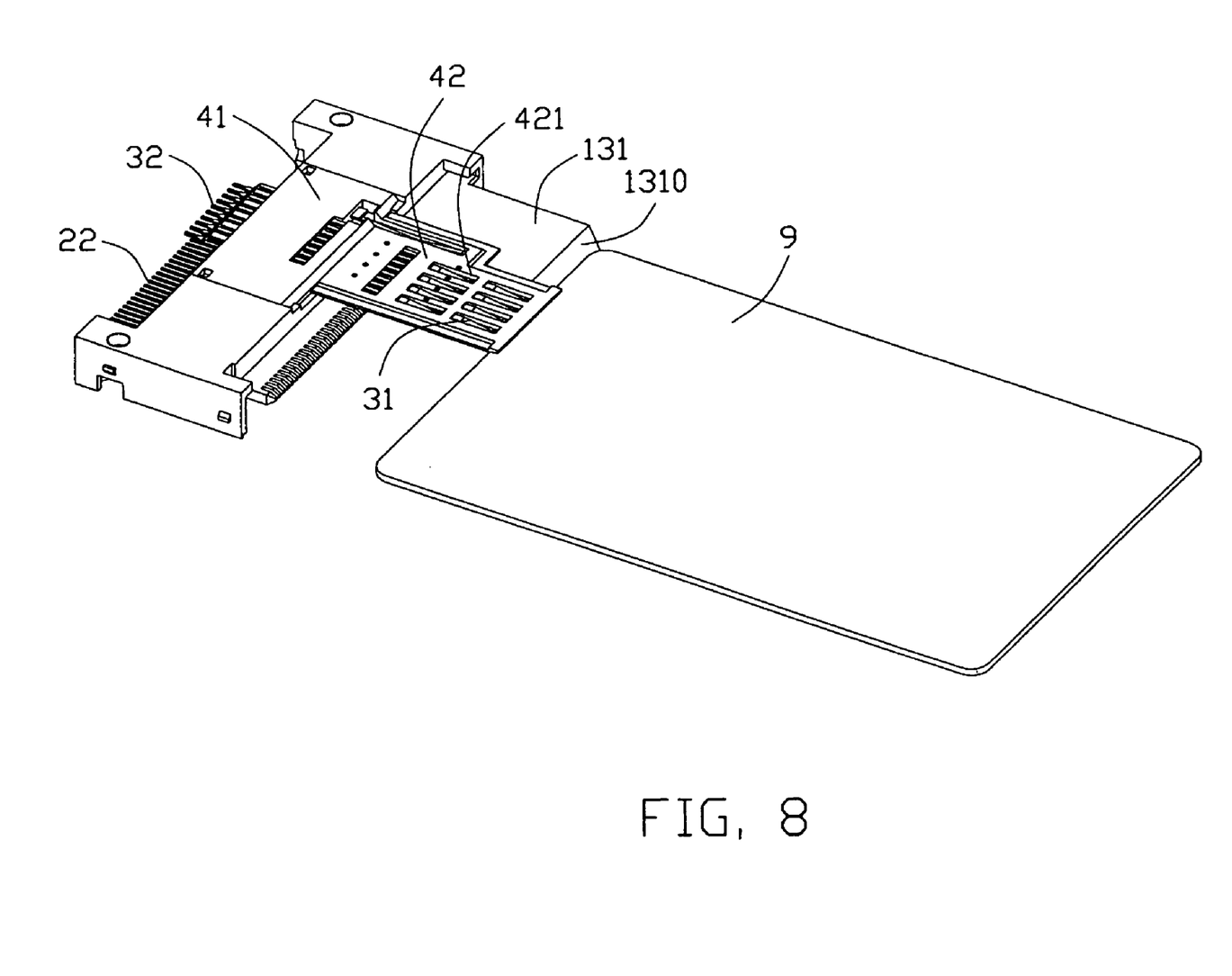
FIG. 8 is a partly assembled perspective view of the card connector shown in FIG. 1, showing status after the smart card collides with a guiding face of the card connector.
Figure 9:
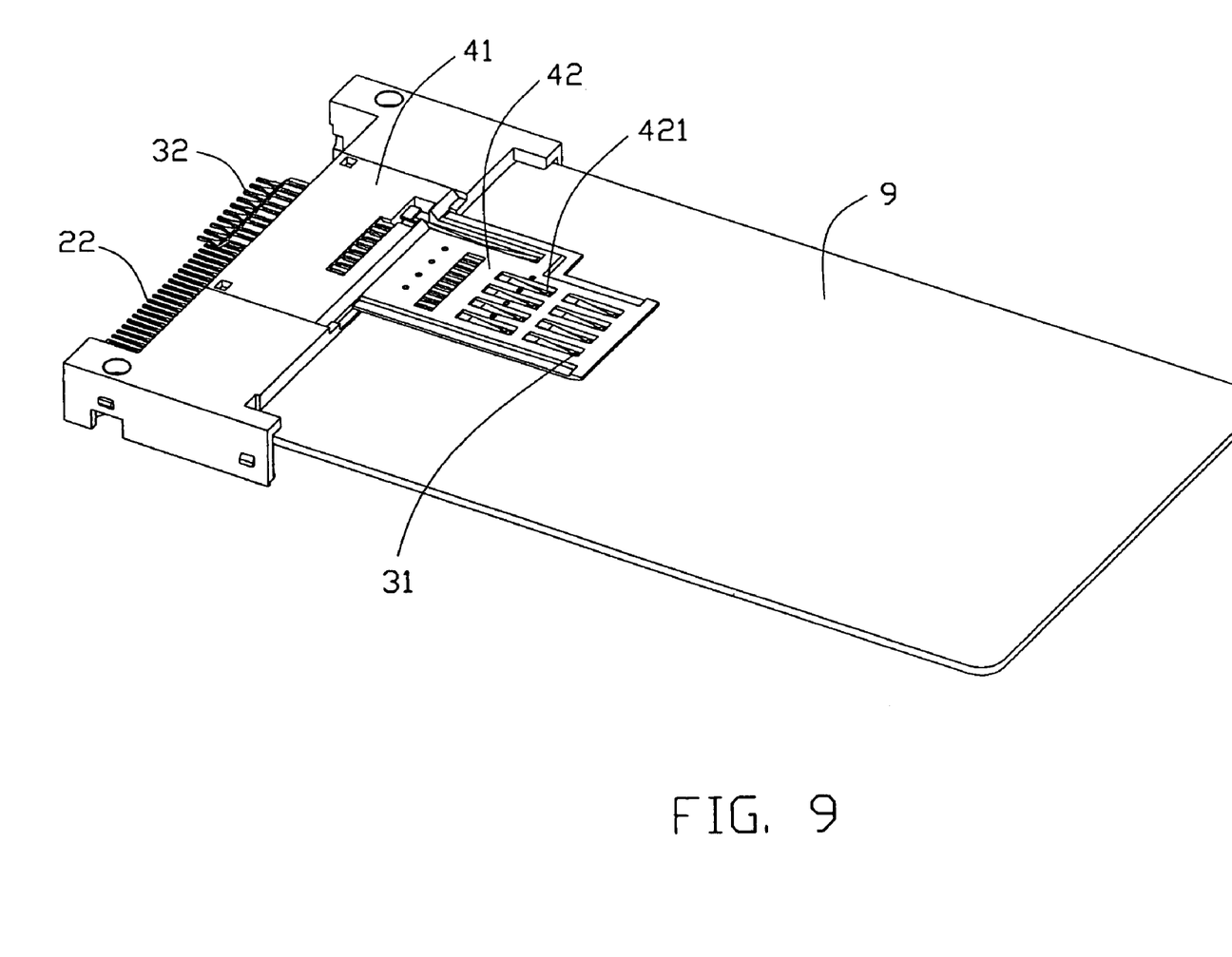
FIG. 9 is a partly assembled perspective view of the card connector shown in FIG. 1, showing final status of insertion of the smart card.

Referring to FIGS. 8 and 9, because width of the smart card 9 is approximately same with that of the card receiving space 50, the stopper 13 and the tongue portion 14 are positioned in the card receiving space 111 in a row along the transverse direction, and distance of the stopper 13 protruding into the card receiving space 111 is longer than that of the tongue portion 14, thus the smart card 9 is prevented by the stopper 13 from inserting into the card receiving space 111 to connect with the tongue portion 14 with the first contacts 22 being arranged. When the smart card 9 is inserted into the card receiving space, it will inserted into the daughter space 112 along the sloping portion 1320, the second guiding portion 132, the sloping portion 1310 and the first guiding portion 131 in turn to electrically connect with the contacting portions 31 of second contacts 3 arranged in the contact module 4.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, comprising:
   a header comprising an insulating main body;
   a shield member coupled on the header to define a card receiving space;
   a plurality of first contacts and second contacts disposed in the insulating main body and exposed in the card receiving space along a vertical direction to electrically connect with a first card and a second card respectively, the first card may approximately occupy the card receiving space fully; and
   a stopper approximately arranged in a row with the first contacts along a transverse direction and protruding into the card receiving space approximately from a corner of the main body, and spaced with the shield coupled on an upper face of the main body to define a daughter space therebetween with the second contacts exposed in to receive the second card; wherein
   further comprising a contact module with the second contacts being arranged and the contact module is formed with a base portion disposed on the insulating main body and a receiving portion extending into the daughter space; wherein
   the insulating main body comprises a tongue portion with the first contacts being enchased; wherein
   the first contacts are used for connecting with an express card and the second contacts are used for connecting with a smart card; wherein
   the stopper is extending from the insulating main body and comprises a first guiding portion, a second guiding portion along a direction adverse to a card inserting direction; wherein the stopper comprises a sloping portion connecting the first guiding portion with the second guiding portion.

2. A card connector assembly comprising:
an insulative housing defining a receiving cavity thereabouts;
a plurality of first contacts disposed in a first position of the housing for coupling to a first type thick electronic card which essentially occupies only a portion of said receiving cavity in a transverse direction while defining around a front end essentially a maximum dimension in a vertical direction of said receiving cavity, and a second type thick electronic card which essentially occupies almost a full dimension of the receiving cavity in said transverse direction except a front corner, and defining a similar dimension with the first type thick electronic card in sail vertical direction;
a plurality of second contacts disposed in a second position of the housing for receiving a third type thin electronic card which essentially the full dimension of the receiving cavity in said transverse direction while only a portion of the receiving cavity in said vertical direction; and
a stopper located around the receiving cavity and defining a first oblique guiding face which is adapted to be in confrontation with the front end of the first type card connector for guiding insertion of the first type card connector toward the first contacts via a forcible movement of said first type electronic card in said transverse direction, a second oblique guiding face for guiding insertion of the third type connector toward the second contacts via a forcible movement of said third type electronic card in said vertical direction, and a block compliant with an offset front corner of the second type electronic card for assuring the second type electronic card in a true position relative to the housing; wherein
said stopper further includes a third oblique guiding face for guiding insertion of the second type electronic card toward the first contacts via a forcible movement of said second type electronic card in said vertical direction.

3. The card assembly as claimed in claim 2, wherein the third oblique guiding face is located in front of the second oblique guiding face.

4. The card assembly as claimed in claim 2, wherein the first oblique guiding face is located in front of the second oblique guiding face.

5. The card assembly as claimed in claim 2, wherein the stopper defines a face for engagement with the first type electronic card in said transverse direction.

6. The card assembly as claimed in claim 2, wherein the stopper defines a face for engagement with the third type electronic card in the vertical direction.

7. The card assembly as claimed in claim 2, wherein the first oblique guiding face is provide by a triangular plate of the stopper, and said triangular plate provides a face engaging the second type electronic card in the vertical direction.

8. The card assembly as claimed in claim 7, wherein said triangular plate further includes a third oblique guiding face for guiding insertion of the second type electronic card toward the first contacts via a forcible movement of said second type electronic card in said vertical direction.

9. The card assembly as claimed in claim 8, wherein the third oblique guiding face is located in front of the second oblique guiding face.

10. An electrical connector assembly comprising:
an insulative housing defining thereabouts a card receiving cavity with width and vertical dimensions thereof;
a plurality of first contacts disposed in the housing and in communication with the card receiving cavity in a vertical direction thereof so as to be engaged with a first type electronic thin card which is received in a portion of the card receiving cavity;
a plurality of second contacts disposed in the housing and in communication with the card receiving cavity in a front-to-back direction perpendicular to said vertical direction so as to be engaged with a second type electronic thick card which is received in another portion of the card receiving cavity;
a stopper located around a front corner of said card receiving cavity and including a rear thick guiding portion to forcibly guide insertion of the first type electronic thin card, and a front thin guiding portion to forcibly guide insertion of the second type electronic thick card; wherein
the first type electronic thin card and the second type electronic thick card are mutually exclusively received in the card receiving cavity; wherein
the rear thick guiding portion defines a face cooperating with the housing to sandwich the first type electronic thin card therebetween in the vertical direction; wherein
the rear thick guiding portion defines a face to engage the second type electronic thick card in the transverse direction; wherein
said front thin guiding portion defines a face to engage a third tape electronic thick card, which, similar to the second type electronic thick card, is adapted to be coupled to the second contacts while with a wider dimension, in the vertical direction.

* * * * *